United States Patent
Horiguchi

(10) Patent No.: US 8,798,026 B2
(45) Date of Patent: Aug. 5, 2014

(54) WIRELESS COMMUNICATION DEVICE AND COMMUNICATION PROGRAM

(75) Inventor: Tomoya Horiguchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 127 days.

(21) Appl. No.: 13/343,336

(22) Filed: Jan. 4, 2012

(65) Prior Publication Data
US 2012/0106535 A1     May 3, 2012

Related U.S. Application Data

(63) Continuation of application No. PCT/JP2009/004800, filed on Sep. 24, 2009.

(51) Int. Cl.
*H04W 52/02* (2009.01)

(52) U.S. Cl.
CPC ................. *H04W 52/0222* (2013.01)
USPC .......................................................... 370/345

(58) Field of Classification Search
None
See application file for complete search history.

(56) References Cited

U.S. PATENT DOCUMENTS

| 7,356,360 B2 | 4/2008 | Katayama et al. | |
|---|---|---|---|
| 2003/0220076 A1 | 11/2003 | Katayama et al. | |
| 2008/0070614 A1* | 3/2008 | Ogushi et al. ............... | 455/522 |
| 2010/0128645 A1* | 5/2010 | Lin et al. ...................... | 370/311 |

FOREIGN PATENT DOCUMENTS

| EP | 1 333 618 | 8/2003 |
|---|---|---|
| JP | 2002-300175 | 10/2002 |
| JP | 2003-087185 | 3/2003 |
| JP | 2003-87185 | 3/2003 |
| JP | 2003-244166 | 8/2003 |
| JP | 2004-320153 | 11/2004 |

OTHER PUBLICATIONS

International Search Report for PCT/JP2009/004800, mailed Mar. 9, 2010.
Office Action dated Jun. 4, 2013 in JP Application No. 2011-532786 with English-language translation thereof.

* cited by examiner

*Primary Examiner* — Huy D Vu
*Assistant Examiner* — Bao G Nguyen
(74) *Attorney, Agent, or Firm* — Nixon & Vanderhye, P.C.

(57) ABSTRACT

A wireless communication device includes a history holder configured to obtain notified timings of transmission requests when the transmission requests are notified, calculates request intervals of notifications of the transmission requests, and holds the request intervals at past n (n is an integer equal to or larger than 2) times; a timing controller configured to determine a transmission interval to the next packet transmission based on the request intervals; a transmitting/receiving unit configured to generate a packet which has time information indicating the transmission interval added to a header part of transmission data, transmits the packet to the other-party wireless communication device, and receives a packet from the other-party wireless communication device; and a communication controller configured to cause at least the transmitting/receiving unit to suspend operation during a period from when the packet is transmitted to when time of the transmission interval elapses.

7 Claims, 6 Drawing Sheets

WIRELESS COMMUNICATION DEVICE AND COMMUNICATION PROGRAM

CROSS-REFERENCE TO RELATED APPLICATIONS

This application is a continuation application of PCT application Serial No. PCT/JP2009/004800, filed on Sep. 24, 2009, the entire contents of which are incorporated herein by reference.

FIELD

Embodiments described herein generally relate to a wireless communication device and a communication program.

BACKGROUND

Conventionally, there is a technology of a wireless communication device of which a communication modem of the communication device determines a transmission interval of packets and causes the own wireless communication device or other wireless communication device in a network to operate in a sleep mode until the next packet transmission, as one of power control techniques to reduce power consumption of a wireless communication device.

A communication modem within a wireless communication device determines a transmission interval of a packet to the next packet transmission, by using one of a constant interval, an increasing function, a decreasing function, a periodic function, based on a transmission rate that is required by a high-order application. The wireless communication device notifies the determined transmission interval to other communication party wireless communication device, and sets the wireless communication device to a sleep mode, and reduces power consumption.

On the other hand, to satisfy latency and throughput that are required by an application, information of the application needs to be considered. For example, in determining a transmission interval of packets, it is necessary to satisfy that a transmission rate required by an application and generation of transmission data are cyclical.

DETAILED DESCRIPTION

In view of the above circumstances, an aspect of the embodiments provides a wireless communication device of which a communicating unit transmits a packet at a transmission request notified from an application layer.

A wireless communication device which transmits a packet according to a transmission request notified from an application layer, the wireless communication device includes a history holder configured to obtain notified timings of transmission requests when the transmission requests are notified, calculates request intervals of notifications of the transmission requests, and holds the request intervals at past n (n is an integer equal to or larger than 2) times; a timing controller configured to determine a transmission interval to the next packet transmission based on the request intervals; a transmitting/receiving unit configured to generate a packet which has time information indicating the transmission interval added to a header part of transmission data, transmits the packet to the other-party wireless communication device, and receives a packet from the other-party wireless communication device; and a communication controller configured to cause at least the transmitting/receiving unit to suspend operation during a period from when the packet is transmitted to when time of the transmission interval elapses.

Another aspect of the embodiments also provides a communication program, stored on a readable medium, of a wireless communication device of which a communicating unit transmits a packet at a transmission request notified from an application layer.

The communication program includes a function that obtains a notified time of the transmission request each time when the transmission request is notified, calculates a request interval of notification of the transmission request, and holds the request interval at past n (n is an integer equal to or larger than 2) times, a function that determines a transmission interval to the next packet transmission based on the past n request intervals, a function that generates a packet which has a time value of the transmission interval added to a header part of transmission data and transmits the packet to the other-party wireless communication device, and a function that causes at least the transmitting/receiving unit to suspend operation during a period from when the packet is transmitted to when time of the transmission interval elapses.

According to the wireless communication device of the aspect of the embodiments, a communication modem can determine a packet transmission interval without receiving application information from an application layer, and can reduce power consumption.

An embodiment is explained in detail below with reference to drawings.

Figure 1:
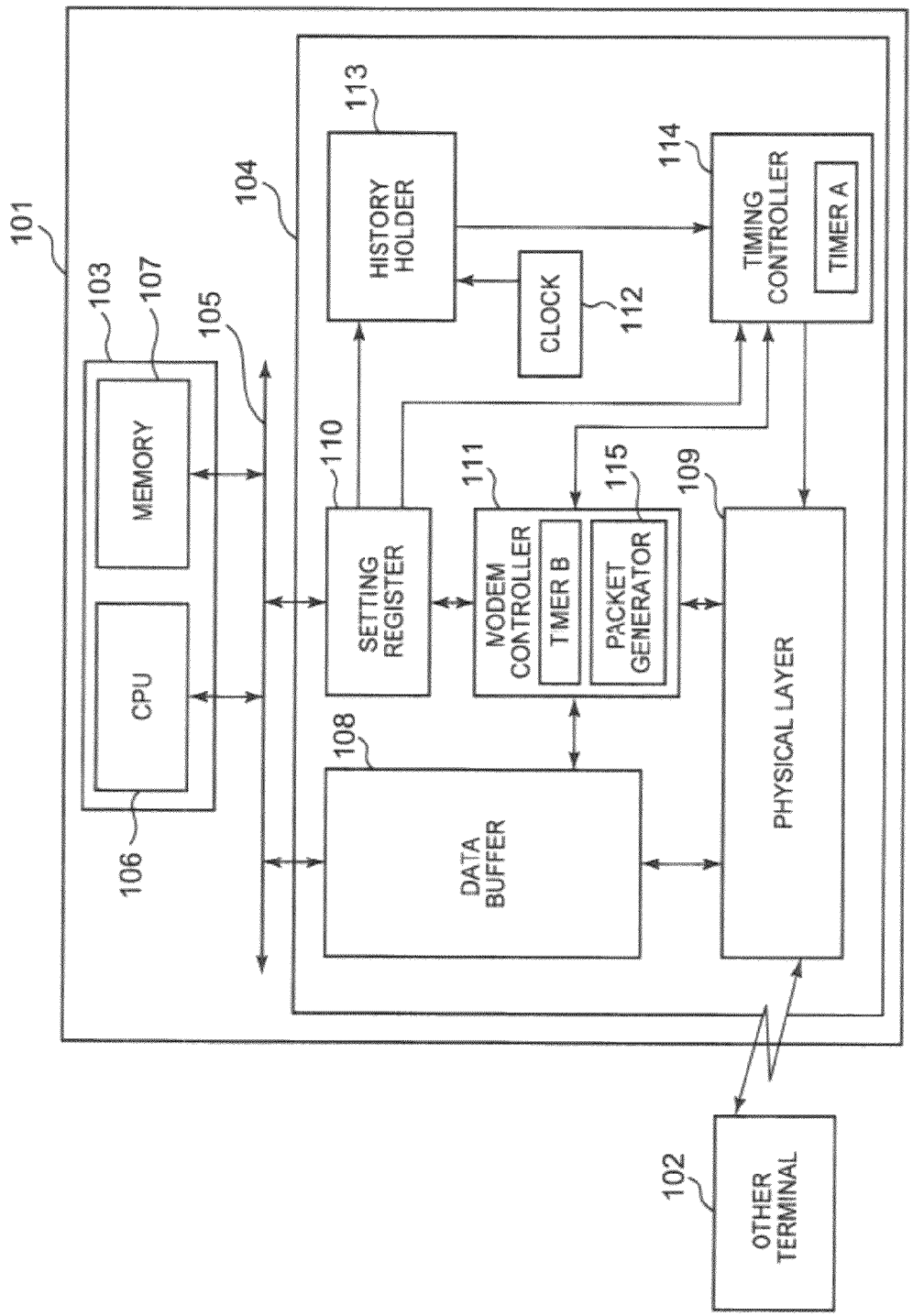
FIG. 1 is a block diagram showing a configuration of a wireless communication device according to an embodiment of the invention.

FIG. 1 shows a configuration of a wireless communication device 101 according to the embodiment of the invention. The wireless communication device 101 transmits/receives a packet to/from other wireless communication device 102 as the other communication party. The wireless communication device 101 and the wireless communication device 102 are assumed to have the same configurations.

The wireless communication device 101 has an application layer 103, a communicating unit (hereinafter, "communication modem") 104, and a bus 105 that connects between these modules.

The application layer 103 has a CPU 106 that performs a total control of the wireless communication device, and a memory 107 that is used for a data buffer and the like.

The communication modem 104 includes a data buffer 108 to exchange data with the application layer 103, a setting register 110 that exchanges instructions and information with the application layer 103, a communication controller (hereinafter, "modem controller") 111 that performs a total control of the communication modem 104, a transmitting/receiving unit (hereinafter, "physical layer") 109 that performs a signal processing for wireless communications, a history holder 113 that calculates and holds an interval of transmission requests notified from the application layer 103, a clock 112 that counts time, a timing controller 114 that notifies a packet transmission timing to the physical layer 109, and a packet generator 115 that generates a transmission packet from data received from the application layer 103. In the embodiment, explanation is based on an assumption that the packet generator 115 is provided in the modem controller 111. The timing controller 114 includes a timer A, and the modem controller 111 includes a timer B. The timer A manages a packet transmission timing, and the timer B manages an operation mode of the wireless communication device 101. As operation modes of the wireless communication device 101, there are a normal operation mode and a sleep mode. The normal operation mode is a state that the wireless communication device 101 normally operates and that a data transmission/receiving function and a carrier sense function are operating. The sleep mode is a state that the wireless communication device 101 is suspending the data transmission/receiving function and the carrier sense function. Specifically, at least a power supply from a power source unit (not shown) to the physical layer 109 is suspended. A detailed switching procedure of the operation mode is described later.

The wireless communication device 101 operates during a packet transmission as follows. It is assumed in this example that transmission data generated by the application layer 103 is stored in the memory 107. First, the CPU 106 transfers the transmission data read from the memory 107, to the data buffer 108 via the bus 105. Thereafter, the CPU 106 writes a transmission request into the setting register 110 of the communication modem 104.

When the CPU 106 writes the transmission request into the setting register 110, the history holder 113 obtains a time t2 when the transmission request is written from the clock 112. The history holder 113 calculates time from the time t2 to a time t1 when the transmission request is written before the time t2 (=t2−t1; this is called "transmission request interval"), and holds this calculated time. The history holder 113 is assumed to hold past n (n: an integer equal to or larger than two) transmission request intervals.

On the other hand, the timing controller 114 obtains the past n-time transmission request intervals from the history holder 113, when the transmission request is written into the setting register 110. The timing controller 114 determines a transmission interval D_ind to the next packet transmission, by using the past n-time transmission request intervals. A determination method of the transmission interval D_ind is described in detail later. The timing controller 114 notifies the determined transmission interval D_ind to the modem controller 111.

Because the timing controller 114 uses the determined transmission interval D_ind as the transmission timing of the next packet transmission, the timing controller 114 holds the transmission interval D_ind until a packet transmission this time is completed. When the packet transmission this time is completed, the timing controller 114 sets the transmission interval D_ind to the timer A, and starts countdown of the timer A. On the other hand, a transmission interval D_ind−1 of the packet transmission this time remains set in the timer A as the transmission interval D_ind−1 that is determined at the last packet transmission time. Accordingly, countdown of the timer A is already started when the last packet transmission is completed. When the countdown of the timer A is finished before the CPU 106 writes a transmission request to the setting register 110, the timing controller 114 immediately notifies a transmission process start signal 1 to the physical layer 109. When the timer A is in the middle of countdown, the timing controller 114 waits for a completion of the countdown of the timer A. When the timer A finishes the countdown, the timing controller 114 notifies the transmission process start signal 1 to the physical layer 109.

On the other hand, when the transmission request is already written in the setting register 110, the modem controller 111 starts a transmission process such as a packet generation and a medium access control. The packet generator 115 incorporated in the modem controller 111 generates a packet.

Figure 2:
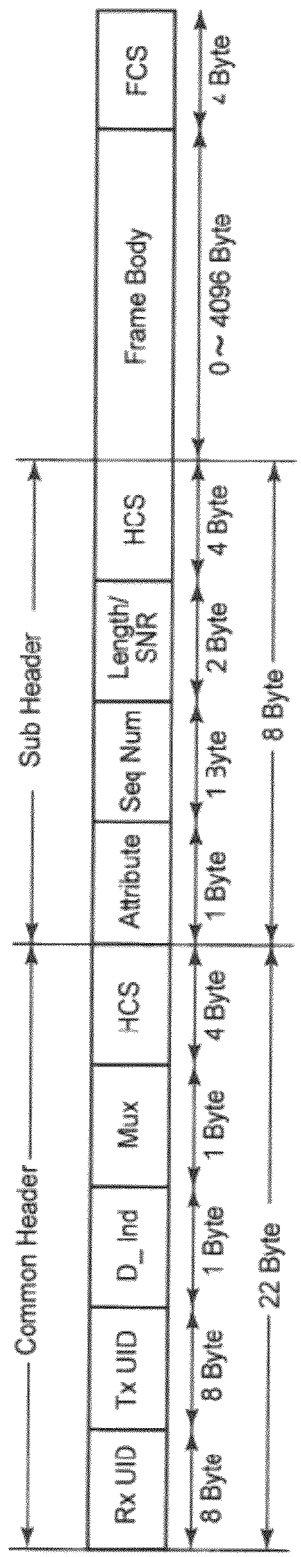
FIG. 2 is a packet format according to the embodiment.

FIG. 2 shows an example of a packet format. A frame format in FIG. 2 shows one packet, and contains Common Header, Sub Header, Frame Body, and FCS (Frame Check Sequence). A sub-packet that contains Sub Header, Frame Body, and FCS can be present by a plural number in one packet. Common Header contains the transmission interval (D_ind), in addition to a destination address (Rx UID) of a packet, a transmission source address (Tx UID), a number of sub-packets (MUX), and a header error detection signal (HCS). A field length of each piece of information is shown in FIG. 2. However, there is no limit to this byte number.

The modem controller 111 reads transmission data from the data buffer 108, and transfers the transmission data to the physical layer 109 while the packet generator 115 generates a header portion of the packet shown in FIG. 2. At a packet generation time, the modem controller 111 stores the transmission interval D_ind notified from the timing controller 114, into a packet D_ind field shown in FIG. 2. In this case, a value of the transmission interval D_ind can be expressed in a predetermined time unit (for example, a hexadecimal number), or absolute time such as a microsecond and a millisecond can be expressed. When each wireless communication device is a system that can know a total unification time, a time of transmitting the next packet can be stored instead of the transmission interval D_ind. The wireless communication device 101 transmits this packet to notify the transmission interval D_ind of an own terminal to the other wireless communication device 102. After completing these transmission processes, the modem controller 111 notifies a transmission process start signal 2 to the physical layer 109.

The modem controller 111 manages an operation mode of the wireless communication device 101. While a detailed operation mode switching procedure is described later, the modem controller 111 determines a time length of the sleep mode by using the transmission interval D_ind notified from the timing controller 114, and sets the determined time length of the sleep mode to the timer B. The modem controller 111 shifts the wireless communication device 101 (the physical layer 109, in this example) after transmitting a packet following an algorithm described later, and starts countdown of the timer B. When the timer B finishes the countdown, the modem controller 111 shifts the wireless communication device 101 to the normal operation mode.

At a stage where the physical layer 109 receives both the transmission process start signal 1 from the timing controller 114 and the transmission process start signal 2 from the modem controller 111, the physical layer 109 adds FCS shown in FIG. 2 to the packet from the data buffer 108 while reading this packet, and thereafter, performs a signal processing for wireless communications. Encoding, modulation, and a D/A (digital/analog) conversion are performed to the packet as a signal processing, for example. A packet that is signal-processed by the physical layer 109 is transmitted as a wave from the wireless communication device 101 to the wireless communication device 102.

Although an example that the modem controller 111 includes the packet generator 115 is explained above, the physical layer 109 may include the packet generator 115.

When the physical layer 109 includes the packet generator 115, the timing controller 114 notifies the determined transmission interval D_ind to the physical layer 109. After the physical layer 109 receives the transmission process start signal 2 from the modem controller 111, the physical layer 109 reads data from the data buffer 108, and the packet generator 115 generates the packet as shown in FIG. 2. In this case, the physical layer 109 stores the transmission interval D_ind notified from the timing controller 114 into the header of the packet.

Shift of the operation mode when the wireless communication device 101 is communicating with the other wireless communication device 102 is explained with reference to FIGS. 1 and 3. In this example, the wireless communication device 101 transmits data and the wireless communication device 102 receives the data.

The wireless communication device 101 and the wireless communication device 102 are configured by the same device as shown in FIG. 1. The application layer 103 of the wireless communication device 101 and a high-order application layer 303 of the wireless communication device 102 shown in FIG. 3 are the same as the high-order application layer 103 in FIG. 1. The communication modem 104 of the wireless communication device 101 and a communication modem 304 of the wireless communication device 102 are the same as the communication modem 104 in FIG. 1. It is assumed that synchronization and initialization processes are already finished between the communication modem 104 of the wireless communication device 101 and the communication modem 304 of the wireless communication device 102. It is also assumed that both the wireless communication device 101 and the wireless communication device 102 are operating in the normal operation mode.

The CPU 106 of the application layer 103 of the wireless communication device 101 writes a transmission request 305 into the setting register 110 of the communication modem 104 at a stage when transmission data is ready. When the transmission request 305 is written, the communication modem 104 of the wireless communication device 101 performs a transmission interval determination process 301 by the timing controller 114, and determines the transmission interval D_ind. The transmission interval determination process 301 is described in detail later.

At the same time, the communication modem 104 of the wireless communication device 101 performs a signal processing for wireless communications to the transmission data read from the data buffer 108, and transmits a packet 306 to the wireless communication device 102. In this case, the packet 306 contains the transmission interval D_ind determined by the transmission interval determination process 301. That is, the transmission interval D_ind as a time interval to transmit the next packet 316 from the wireless communication device 101 is notified to the wireless communication device 102.

That is, the transmission interval D_ind determined by the transmission interval determination process 301 is an interval to guarantee that the wireless communication device 101 does not transmit a packet. During this period, even when a transmission request is transmitted from the application layer 103 of the wireless communication device 101, the communication modem 104 of the wireless communication device 101 does not perform a packet transmission process, and a packet remains stored in the data buffer 108. On the other hand, when a data transmission request does not arise from the application layer 103 of the wireless communication device 101, a packet transmission is not performed even when the time of the transmission interval D_ind elapses. The wireless communication device 102 receives the packet 306 transmitted from the wireless communication device 101, and obtains reception data. When an error is not detected in the reception data, the wireless communication device 102 transmits an affirmative response 307 to the wireless communication device 101.

Operation of the wireless communication device 102 is explained below with reference to FIG. 1. First, the wireless communication device 102 transfers reception data 308 from the communication modem 304 to the application layer 303. Thereafter, the communication modem 304 of the wireless communication device 102 obtains the transmission interval D_ind of the wireless communication device 101 from the packet 306 transmitted from the wireless communication device 101. The modem controller 111 within the communication modem 304 of the wireless communication device 102 calculates a time length of the sleep mode based on this transmission interval D_ind, and sets the transmission interval D_ind to the timer B. Thereafter, the communication modem 304 of the wireless communication device 102 shifts to asleep mode 313, and starts countdown of the timer B.

When the wireless communication device 102 calculates a time length of the sleep mode, the wireless communication device 102 calculates a scheduled time of transmitting the next packet from the transmission interval D_ind stored in the header of a received packet. The wireless communication device 102 determines a time length of the sleep mode such that the carrier sense 314 and the next data reception 316 can be started at the scheduled transmission time of the next packet by considering shift time required to complete the shift to the normal operation mode after starting the power source of the physical layer 109. When the communication mode 304 shifts from the sleep mode 313 to the normal operation mode after the timer B completes the countdown, the wireless communication device 102 performs the carrier sense 314 and becomes in a packet reception waiting state.

On the other hand, when the communication modem 104 of the wireless communication device 101 receives the affirmative response 307, the communication modem 104 notifies that transmission of the packet data 306 is successful by information 309 to the application layer 103. Thereafter, the communication modem 104 of the wireless communication device 101 performs a carrier sense 310 and confirms that there is no packet transmission from the wireless communication device 102.

When there is no packet transmission from the wireless communication device 102, the communication modem 104 of the wireless communication device 101 sets a time length of the sleep mode to the timer B of the modem controller 111 based on the transmission interval D_ind determined by the transmission interval determination process 301. The time length of the sleep mode is determined by considering shift time taken to shift to the normal operation mode after starting the power source of each circuit and time of a carrier sense 312 to confirm interference. Thereafter, the communication mode 104 shifts to a sleep mode 311 and starts countdown of the timer B.

When the timer B finishes the countdown, the communication modem 104 shifts from the sleep mode 311 to the normal operation mode and performs the carrier sense 312. On the other hand, when a packet transmission from the wireless communication device 102 is detected by the carrier sense 310, the communication modem 104 dose not shift to the sleep mode and performs a packet reception operation as described above.

Figure 3:
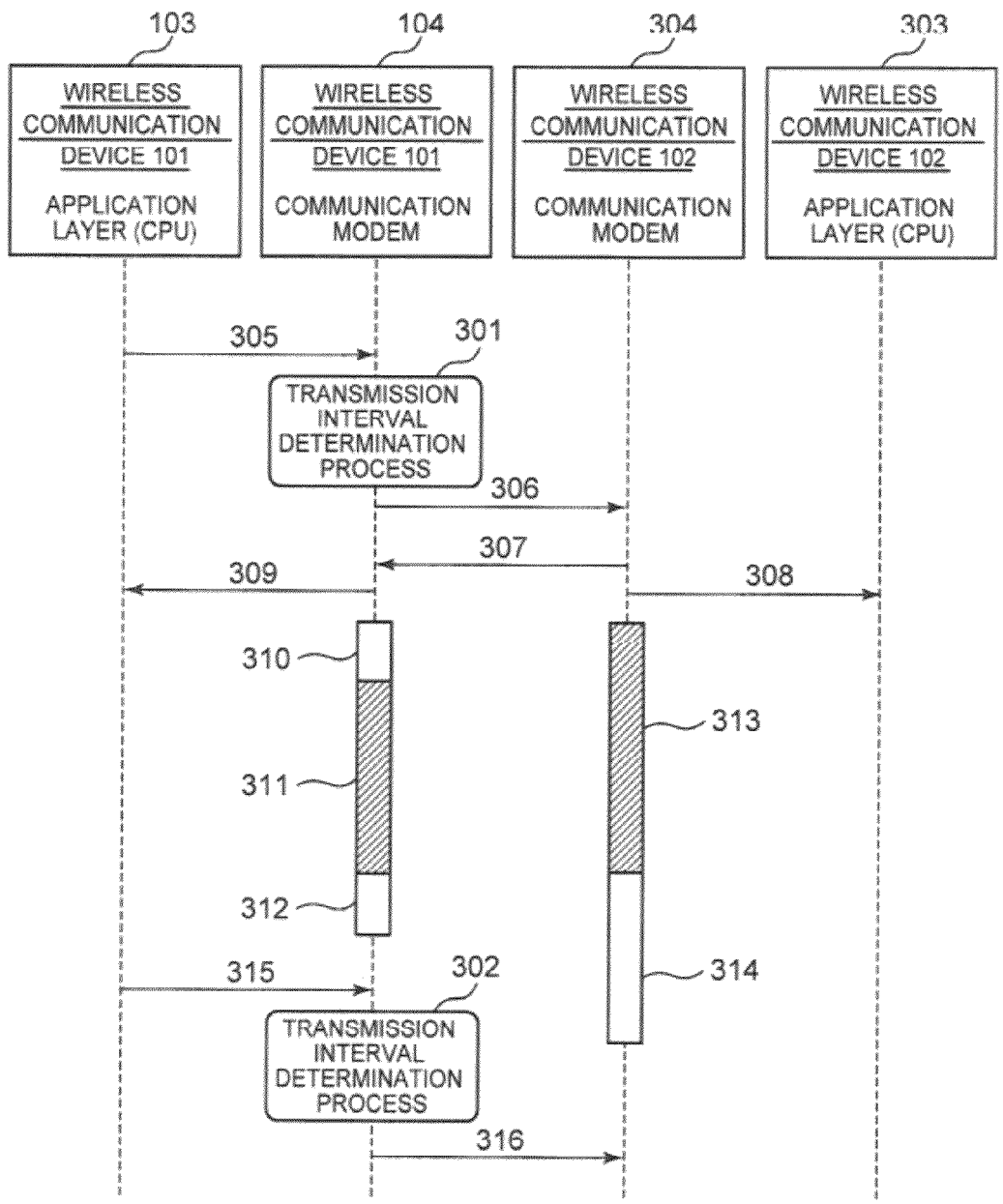
FIG. 3 is a sequence chart between wireless communication devices according to the embodiment.

FIG. 3 shows a state that the application layer 103 of the wireless communication device 101 notifies a new transmission request 315 to the communication modem 104. The communication modem 104 of the wireless communication device 101 receives the transmission request 315, performs a transmission interval determination process 302, and determines a transmission interval D_ind+1 to the next data transmission. Because the time of the transmission interval D_ind determined by the last transmission interval determination process 301 already elapsed, the communication modem 104 of the wireless communication device 101 transmits the packet 316. Thereafter, the wireless communication device 101 and the wireless communication device 102 repeat operation similar to that explained above.

Figure 4:
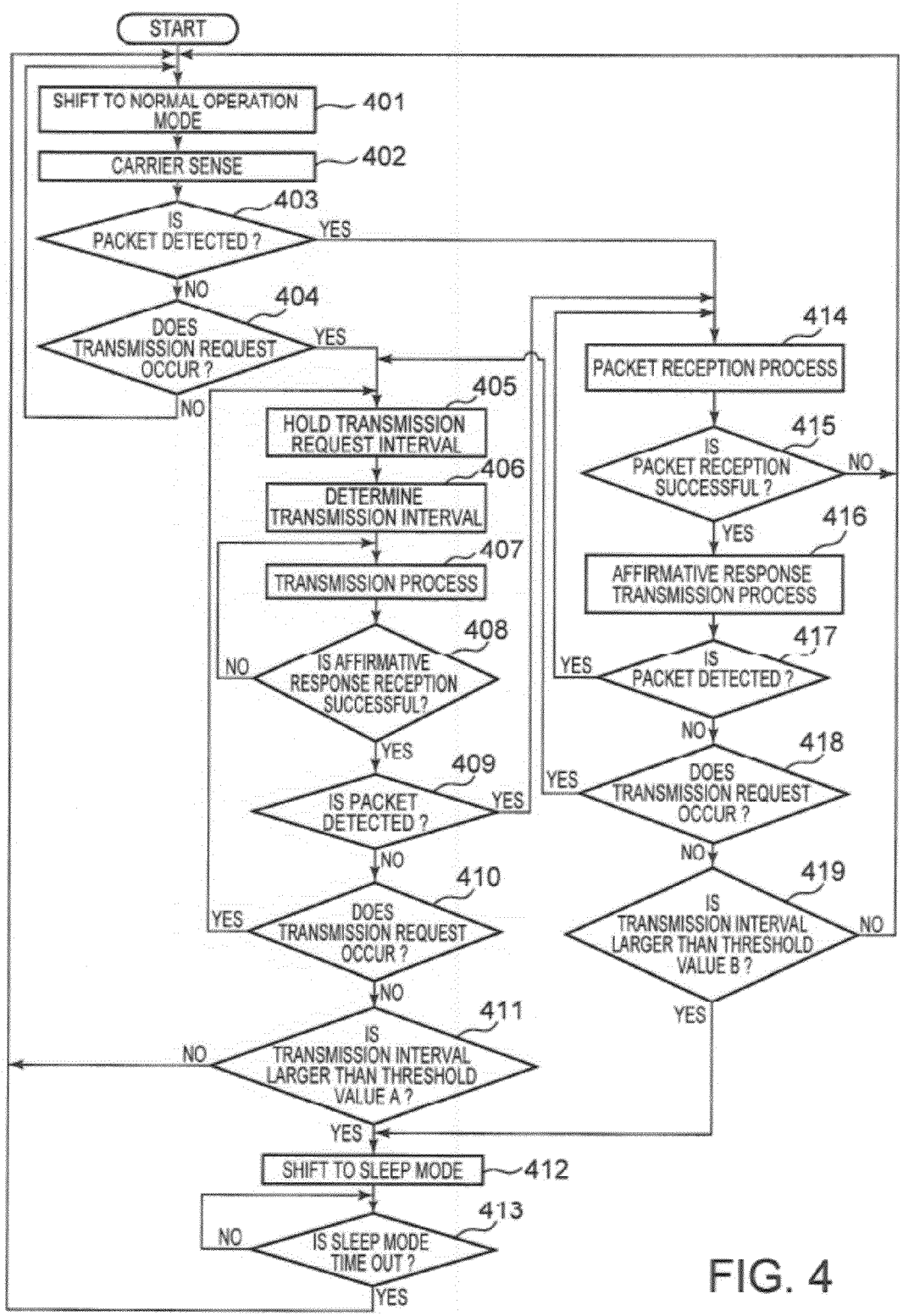
FIG. 4 is a flowchart showing operation of the wireless communication device according to the embodiment.

A determination method of the transmission interval D_ind by the timing controller 114 (details of the transmission interval determination processes 301, 302 in FIG. 3), and a switching procedure of an operation mode by the modem controller 104 are explained in detail next with reference to a flowchart in FIG. 4. In this example, it is assumed that synchronization and initialization processes are already finished between the wireless communication device 101 and the other wireless communication device 102.

First, the wireless communication device 101 shifts to the normal operation mode (Step S401), and performs carrier sense (Step S402). The wireless communication device 101 waits for a packet from the other wireless communication device 102 (Step S403), and waits for a transmission request from the application layer 103 (Step S404).

When the wireless communication device 101 detects reception of a packet from the wireless communication device 102 (Yes in Step S403), the wireless communication device 101 branches to a packet reception process described later (Step S414). When reception of a packet from the wireless communication device 102 is not detected (No in Step S403), the wireless communication device 101 checks whether there is a transmission request from the application layer 103 (Step S404).

When a transmission request is notified from the application layer 103 (Yes in Step S404), the history holder 113 calculates a transmission request interval by subtracting the time t1 when a transmission request is notified last time from the time t2 when a transmission request obtained from the clock 112 is notified (t2−t1). The history holder 113 holds history regarding the calculated past n-time transmission request intervals (Step S405). The timing controller 114 determines the transmission interval D_ind to the next packet transmission by using the n-time transmission request intervals supplied from the history holder 113 (Step S406).

As a method of determining the transmission interval D_ind by the timing controller 114, there is a method of setting an intermediate value of the past n-time transmission request intervals as the transmission interval D_ind. There is also a method of setting a minimum value of the past n-time transmission request intervals as the transmission interval D_ind. There is also a method of setting an average value of the past n-time transmission request intervals as the transmission interval D_ind by calculating this average value. There is also a method of setting an m-th (m is an integer equal to or smaller than n) value in ascending order in the past n-time transmission request intervals as the transmission interval D_ind. In this case, when it is desired to shorten latency from a transmission request from the application layer 103 to a completion of packet transmission by the physical layer 109 (when a latency request from the application is high), m is set to a small value. On the other hand, when a power reduction request from the application is high, m is set to a large value. A value of m can be dynamically changed by matching a high/low level of the latency request and the power reduction request. When the application decides that a maximum value of latency is D_max as a latency request, a transmission interval calculated from the past n-time transmission request intervals is compared with a requested maximum latency D_max, and a smaller value can be set as the transmission interval D_ind. When there is no spare capacity in the data buffer 108 to hold transmission request queues or transmission data, the transmission interval D_ind can be set as a minimum value (0, for example) without using the past n-time transmission request intervals.

The communication modem 104 of the wireless communication device 101 determines the transmission interval D_ind by any of the above-described methods. A determined transmission interval D_ind is stored in the header of the packet, a signal transmission process for wireless communications (Step S407) is performed, and the packet is transmitted to the other wireless communication device 102.

After the packet transmission, the wireless communication device 101 confirms presence of reception of an affirmative response regarding the transmitted packet from the other wireless communication device 102 (Step S408). Presence of reception of an affirmative response can be also determined by presence of occurrence of an error within an affirmative response packet by using an error detection code contained within the affirmative response packet. When an affirmative response cannot be received within predetermined time after a packet transmission (No in Step S408), a packet transmission process is performed again (Step S407).

On the other hand, when the wireless communication device 101 can receive an affirmative response (Yes in Step S408), the wireless communication device 101 decides whether a packet is already transmitted from the other wireless communication device 102 (Step S409). When the wireless communication device 101 detects that a packet is already transmitted from the other wireless communication device 102 within predetermined time after receiving an affirmative response (Yes in Step S409), the wireless communication device 101 shifts to a state of a packet reception process (Step S414).

On the other hand, when a packet is not transmitted from the other wireless communication device 102 (No in Step S409), the modem controller 111 of the wireless communication device 101 confirms presence/absence of the next data transmission request (Step S410). When a transmission request is present (Yes in Step S410), the modem controller 111 starts a process for the transmission (Step S405).

On the other hand, when a transmission request is not present (No in Step S410), the modem controller 111 compares the transmission interval D_ind supplied from the timing controller 114 with a predetermined threshold value X. The threshold value X is preferably a sum of packet transfer time from when a transmission request is notified from the application layer 103 to when a packet transmission is started, transmission/reception switching time, affirmative response receiving time, shift time to the sleep mode, return time to the normal operation mode, and pre-transmission interference detecting time, for example. When the transmission interval D_ind is smaller than the predetermined threshold value X (No in Step S411), the wireless communication device 101 shifts to the normal operation mode without entering the sleep mode (Step S401). However, when the transmission interval D_ind is larger than the threshold value X, the wireless communication device 101 shifts to the sleep mode (Step S412).

In the sleep mode, the wireless communication device 101 interrupts a power supply to at least the physical layer 109 without performing data transmission/reception and carrier sense. With this arrangement, power consumption by the wireless communication device 101 is reduced. Time obtained by subtracting the threshold value X from the determined transmission interval D_ind is used as the time during which the wireless communication device 101 keeps the sleep mode. After this value is set to the timer B of the modem controller 111, the wireless communication device 101 shifts from the sleep mode to the normal operation mode (Step S401) at a finish time of countdown of the timer B (Yes in Step S413).

Packet reception operation of the wireless communication device 101 is explained next. After the wireless communication device 101 shifts to the normal operation mode (Step S401), the wireless communication device 101 performs the carrier sense (Step S402) again. When the wireless communication device 101 detects a packet from the other wireless communication device 102 (Yes in Step S403), the wireless communication device 101 performs a packet reception process (Step S414). This packet contains the transmission interval D_ind to the next packet transmission by the other wireless communication device 102 following the packet format in FIG. 2.

After the wireless communication device 101 performs the packet reception process, the wireless communication device 101 determines whether the packet reception is successful (Step S415). Whether the packet reception is successful can be decided by checking presence/absence of occurrence of an error in the packet by using an error detection code contained in a payload portion of the packet. When an error occurs in the packet and also when the packet reception is unsuccessful (No in Step S415), the wireless communication device 101 shifts to the normal operation mode to prepare for retransmission of a packet (Step S401). On the other hand, when the packet reception is successful (Yes in Step S415), the wireless communication device 101 performs an affirmative response transmission process to notify the reception of the packet to the other wireless communication device 102 (Step S416). In the affirmative response transmission process, the wireless communication device 101 generates an affirmative response packet and transmits the affirmative response packet.

After transmitting the affirmative response packet, the wireless communication device 101 further decides whether a packet is already transmitted from the other wireless communication device 102 (Step S 417). When a packet is already transmitted from the other wireless communication device 102 within predetermined time after completing the affirmative response packet (Yes in Step S417), the wireless communication device 101 shifts to a data reception process (Step S414).

On the other hand, when a packet transmission from the wireless communication device 102 is not detected (No in Step S417), the wireless communication device 101 confirms presence/absence of the next transmission request from the application layer 103 (Step S418). When a transmission request from the application layer 103 is present (Yes in Step S418), the wireless communication device 101 starts a process for the transmission (Step S405). When a transmission request is not present (No in Step S418), the wireless communication device 101 compares the transmission interval D_ind of the wireless communication device 102 contained in the reception data with a predetermined threshold value Y. The threshold value Y is preferably a sum of packet transfer time from when the application layer notifies a transmission request to when the application layer starts a packet transmission, transmission/reception switching time, affirmative response receiving time, shift time to the sleep mode, and return time to the carrier sense mode.

When the transmission interval D_ind is smaller than the threshold value Y (No in Step S419), the wireless communication device 101 shifts to the normal operation mode without entering the sleep mode (Step S401). When the transmission interval D_ind is larger than the threshold value Y, (Yes in Step 419), the wireless communication device 101 shifts to the sleep mode (Step S412). Time obtained by subtracting the threshold value Y from the transmission interval D_ind notified from the wireless communication device 102 is used for a time length of the sleep mode. After setting this value to the timer B of the modem controller 111, the wireless communication device 101 shifts from the sleep mode to the normal operation mode (Step S401), at a finish time of countdown of the timer B (Yes in Step S413).

Although an example of using an affirmative response is explained with reference to the flowchart in FIG. 4, the wireless communication device 101 can similarly operate in the system using a negative response.

A result of a simulation performed regarding an effect of using the determination method of the transmission interval D_ind according to the embodiment is explained next with reference to FIGS. 5A to 5C and FIGS. 6A to 6C. A condition of the simulation is that a maximum transfer rate of a communication modem is 1.9 Gbps, power consumption by the communication modem at a transmission time is 400 mW, power consumption by the communication modem at a carrier sense time is 200 mW, and power consumption of the communication modem in the sleep mode is 0.1 mW. It is also assumed that the communication modem has history of past eight-time (n=8) transmission request intervals to determine the transmission interval D_ind, and that a packet error rate is 0.16, and an affirmative response packet error rate is 0.001.

Figures 5A, 5B, 5C:
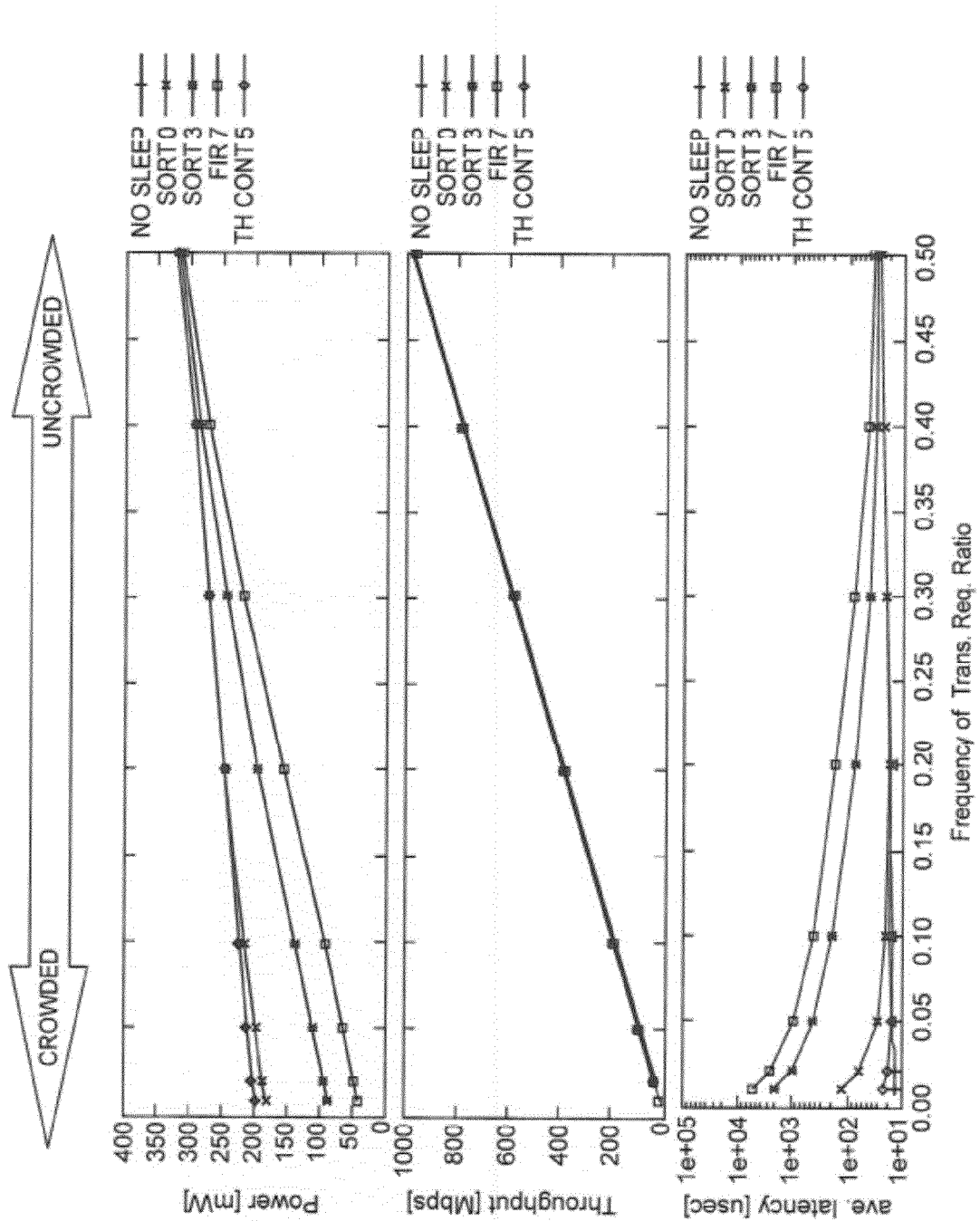
FIGS. 5A to 5C are graphs showing a result of a simulation indicating a first characteristic example of the wireless communication device according to the invention.
Figures 6A, 6B, 6C:
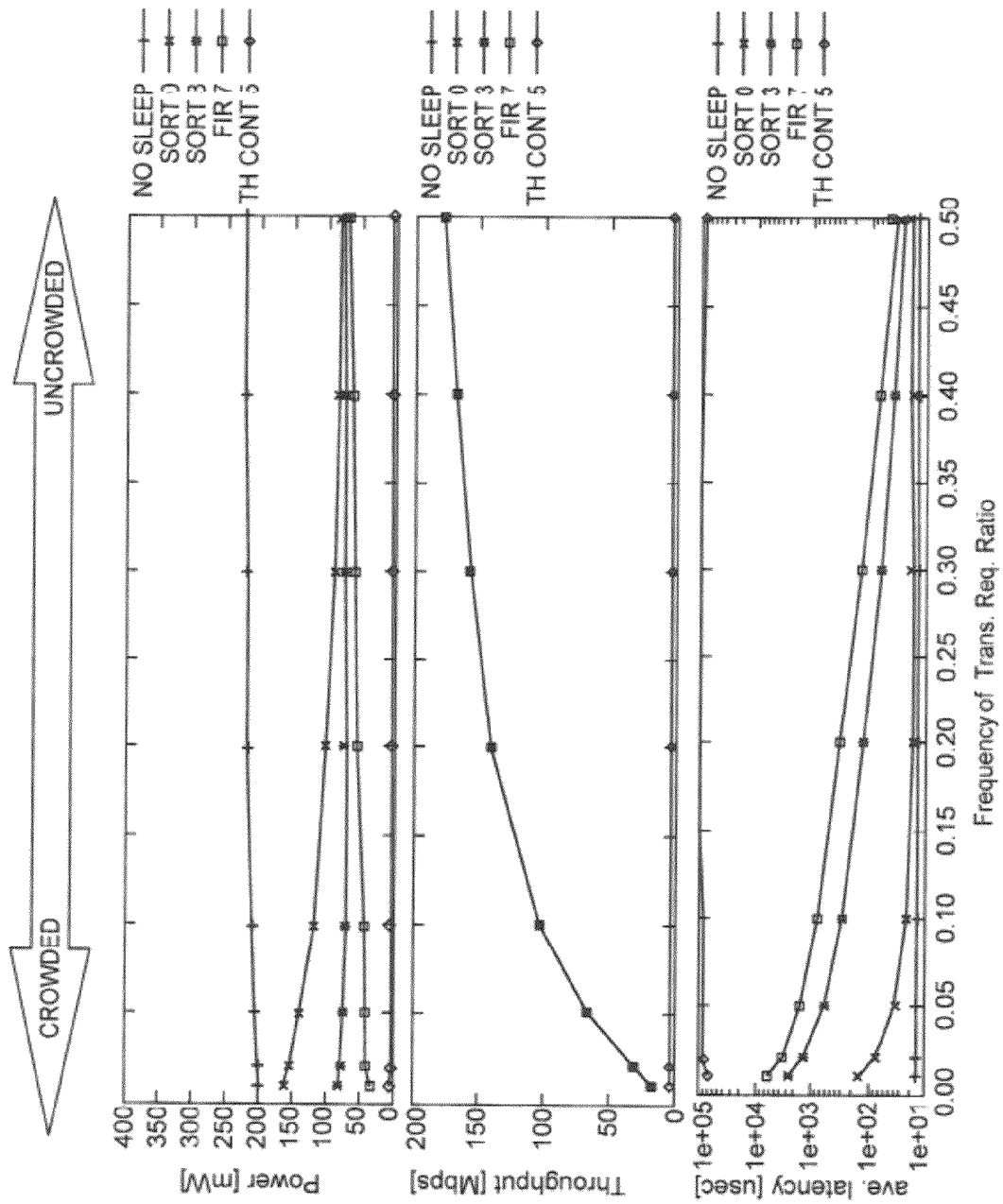
FIGS. 6A to 6C are graphs showing a result of a simulation indicating a second characteristic example of the wireless communication device according to the invention.

FIGS. 5A to 5C show a case where a ratio of maximum throughput of the application layer 103 to maximum throughput of the communication modem is 1:1. FIGS. 6A to 6C show a case where this ratio is 1:11. A lateral axis of FIGS. 5A to 5C and FIGS. 6A to 6C indicates a degree of crowdedness in the bus 105. That is, the left side of FIGS. 5A to 5C indicates a situation ("crowded") that the bus 105 is crowded, throughput of the application layer 103 is low, and a variance value of the transmission request interval is large. The right side of FIGS. 5A to 5C indicates a situation ("uncrowded") that the bus 105 is not crowded, and a variance value of the transmission request interval is small. A vertical axis of FIG. 5A indicates power consumption of the communication modem. A vertical axis of FIG. 5B indicates throughput of data between wireless communication devices. A vertical axis of FIG. 5C indicates latency from occurrence of a transmission request to completion of a transmission. An algorithm used for the simulation as the determination method of the transmission interval D_ind is as follows.

Embodiment

NO_SLEEP: When a wireless communication device does not enter the sleep mode. That is, the transmission interval always becomes D_ind=0.

SORT_0: When an algorithm that a minimum value of history of a transmission request interval is D_ind is used.

SORT_3: When an algorithm that an intermediate value of history of a transmission request interval is D_ind is used.

FIR_7: When an algorithm that an average value of history of a transmission request interval is D_ind is used.

When NO_SLEEP is used, throughput is always a maximum value and latency is always a minimum value in both FIGS. 5A to 5C and FIGS. 6A to 6C as compared with other algorithm. This is because in NO_SLEEP, the communication modem can quickly transmit data to the other wireless communication device 102 immediately after occurrence of the transmission request by always monitoring a transmission request from the high-order application layer 103. On the other hand, because the wireless communication device 101 always continues the carrier sense operation without shifting to the sleep mode, power consumption becomes a maximum as compared with power consumption in the algorithm of shifting to the other sleep mode.

When SORT_0, SORT_3 and FIR_7 as algorithms of the embodiment are used, it can be understood that power consumption is suppressed without reducing throughput (throughput of NO_SLEEP) of data to be primarily transferred, in any of FIGS. 5A to 5C and FIGS. 6A to 6C. A size of power consumption when these algorithms are used becomes in a relationship of tradeoff with a size of latency. Therefore, any algorithm can be selected by matching a power consumption request of the system or a latency request, and the algorithm can be suitably switched by matching this request.

Comparative Examples

TH_CONT_5: When an algorithm (an algorithm disclosed in Japanese Patent Application Laid-Open No. 2004-320153) of increasing D_ind is used when a transmission request interval is equal to or larger than a threshold value. The threshold value is set by using throughput information from the application layer 103, and is fixed.

When TH_CONT_5 (the algorithm disclosed in Japanese Patent Application Laid-Open No. 2004-320153) is used, although reduction of throughput is not observed, there is no effect of suppressing power consumption, when the ratio of maximum throughput of the application layer to maximum throughput of the communication modem is 1:1 as shown in FIGS. 5A to 5C. When the ratio of maximum throughput of the application layer 103 to maximum throughput of the communication modem is 1:11 as shown in FIGS. 6A to 6C, it is clear that although effect of suppressing power consumption is observed, data requested from the application layer cannot be transmitted and that throughput is greatly reduced as compared with reduction in other algorithm. When the algorithm of continuously controlling the transmission interval D_ind is used in this way, the application layer 103 essentially requires detailed information such as throughput information, and there is a possibility that independency of the application layer and the communication modem is lost.

As described above, according to the wireless communication device of the embodiment, independency of the application layer and the communication modem can be maintained even when the wireless communication device does not receive detailed information required by the application layer such as information of a transmission rate, a pattern and a tendency of occurrence of a transmission request. That is, when the communication modem determines the transmission interval D_ind by observing a transmission start request signal from the application layer, independency of the application layer and the communication modem can be maintained by satisfying a latency request and a throughput request that are required by the application layer. Further, power consumption can be reduced by shifting to the sleep mode during a determined transmission interval D_ind and by disconnecting an unnecessary power supply to circuits.

The invention is not limited to the above embodiment, and can be achieved by modifying constituent elements within a range not deviating from the gist of the invention. Various inventions can be formed by suitably combining plural constituent elements disclosed in the above embodiment. For example, various constituent elements can be deleted from whole constituent elements disclosed in the embodiment. Further, constituent elements in different embodiments can be suitably combined.

What is claimed is:

1. A wireless communication device for transmitting a packet according to a transmission request notified from an application layer, the wireless communication device comprising:
a history holder configured to obtain notified timings of transmission requests if the transmission requests are notified, calculate request intervals of notifications of the transmission requests, and hold the request intervals at past n (n is an integer equal to or larger than 2) times in ascending order;
a timing controller configured to determine a transmission interval to a next packet transmission based on the request intervals;
a transmitting/receiving unit configured to generate a packet which includes time information indicating the transmission interval in a header part of transmission data, transmit the packet to another party wireless communication device, and receive a packet from the other-party wireless communication device; and
a communication controller configured to cause at least the transmitting/receiving unit to suspend operation during a period from when the packet is transmitted to when time of the transmission interval elapses, wherein
the timing controller determines, as the transmission interval, an m-th (m is an integer equal to or smaller than n) value of the past n transmission request intervals held in the history holder in ascending order, and sets m to a value closer to 1 if a request to shorten time from when the transmission request is notified to when the packet transmission is started is notified from the application layer, and sets m to a value closer to n if a request to reduce power consumption is notified from the application layer.

2. The wireless communication device according to claim 1, wherein
the communication controller causes at least the transmitting/receiving unit to suspend operation during a period from when the packet is transmitted to when time of the transmission interval elapses, if the communication controller receives an affirmative response to the packet after the packet transmission.

3. The wireless communication device according to claim 1, wherein
the communication controller causes at least the transmitting/receiving unit to suspend operation during a period when time of the transmission interval of a reception packet elapses, when the communication controller receives the packet containing time information indicating the transmission interval and also when there is no transmission request from the application layer of high order.

4. A computer program stored on a non-transitory computer-readable medium for causing a computer to perform operations for transmitting a packet at a transmission request notified from an application layer, the operations comprising:
obtaining a notified time of the transmission request each time when the transmission request is notified;
calculating a request interval of notification of the transmission request;
holding the request interval at past n (n is an integer equal to or larger than 2) times in ascending order;

determining a transmission interval to a next packet transmission based on the past n request intervals;

generating a packet which includes time information indicating transmission interval in a header part of transmission data;

transmitting the packet to another party wireless communication device; and causing at least a transmitting/receiving operation to be suspended during a period from when the packet is transmitted to when time of the transmission interval elapses, wherein the transmission interval is determined as an m-th (m is an integer equal to or smaller than n) value of the past n transmission request intervals held in ascending order, and m is set to a value closer to 1 if a request to shorten time from when the transmission request is notified to when the packet transmission is started is notified from the application layer, and m is set to a value closer to n if a request to reduce power consumption is notified from the application layer.

5. The wireless communication device according to claim 1, further comprising:

an application layer from which the transmission data is transmitted.

6. The wireless communication device according to claim 5, wherein:

the application layer includes a memory for storing the generated transmission data.

7. A wireless communication method for transmitting a packet according to a transmission request notified from an application layer, the method comprising:

obtaining notified timings of transmission requests if the transmission requests are notified;

calculating request intervals of notifications of the transmission requests;

holding the request intervals at past n (n is an integer equal to or larger than 2) times in ascending order;

determining a transmission interval to a next packet transmission based on the request intervals;

generating a packet which includes time information indicating the transmission interval in a header part of transmission data;

transmitting the packet to another party wireless communication device;

receiving a packet from the other-party wireless communication device; and causing at least a transmitting/receiving operation to be suspended during a period from when the packet is transmitted to when time of the transmission interval elapses, wherein the transmission interval is determined as an m-th (m is an integer equal to or smaller than n) value of the past n transmission request intervals held in ascending order, and m is set to a value closer to 1 if a request to shorten time from when the transmission request is notified to when the packet transmission is started is notified from the application layer, and m is set to a value closer to n if a request to reduce power consumption is notified from the application layer.

* * * * *